3,558,726
NITRO-SUBSTITUTED PHENYLCYCLOPROPANES
Herman A. Bruson, Woodbridge, and Howard L. Plant, Milford, Conn., assignors to Olin Corporation, a corporation of Virginia
No Drawing. Filed Sept. 30, 1968, Ser. No. 763,911
Int. Cl. C07c 79/12; A01n 9/20
U.S. Cl. 260—646                    7 Claims

ABSTRACT OF THE DISCLOSURE

Nitro-substituted phenylcyclopropanes are prepared by reacting a phenylcyclopropane, such as 1-chloro-1-bromo-2-phenylcyclopropane with a nitration acid. The compounds of this invention are useful as fungicides, insecticides or herbicides. Further, they are useful as additives for plastics to form compositions resistant to fungi and algae atacks in soils and aquatic media.

---

This invention relates to nitro-substituted phenylcyclopropanes and to a method for their preparation. More specifically, this invention relates to compounds of the formula:

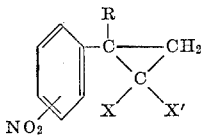

wherein R is selected from the group consisting of hydrogen and alkyl of from 1 to 5 carbon atoms and X and X' are selected from the group consisting of chlorine and bromine which are prepared by adding nitration acid to the appropriate dihalophenylcyclopropane.

The novel compounds of this invention are prepared by adding nitration acid to a compound of the formula:

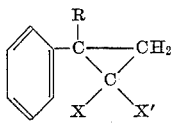

where R, X and X' have the same meaning as described above. The reaction proceeds as shown in the following equation, where for purposes of illustration, the reaction of 1-chloro-1-bromo-2-phenylcyclopropane with nitration acid, is shown:

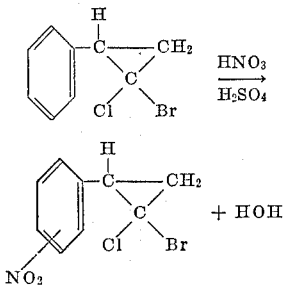

Generally, the time of reaction will vary from about 1 hr. to about 6 hrs. or more and preferably, will be from about 2 to about 4.5 hrs. The order of addition of the reactants is important and it has been found that the mixed acid must be added to the dihalo-2-phenylcyclopropane compound if satisfactory yields are to be obtained and to avoid the formation of by-products.

The mixed acid employed in the process of this invention is the so-called nitration acid of commerce which is a mixture of nitric and sulfuric acids. Usually sufficient mixed acid is supplied to introduce from about 1 to about 2.5 moles of nitric acid per mole of the dihalo-2-phenylcyclopropane derivative and preferably from 1 to about 1.75 moles of nitric acid per mole of the initially added phenylcyclopropane compound. Generally, sufficient mixed acid will be added to provide from about 1 to about 3.5 moles or more of sulfuric acid per mole of cyclopropane and preferably from about 1.5 to about 3.5 moles per mole of the phenylcyclopropane initially added. The strength of the nitric acid employed can vary upward from about 60 percent. Likewise, the strength of the sulfuric acid employed generally will range from about 80 percent $H_2SO_4$ and preferably will be about 96-98 percent $H_2SO_4$.

The nitro-substituted products of this invention can be recovered by a number of methods well known in the art. For example, the product can be poured onto crushed ice, and then treated with diethyl ether to break the emulsion formed. The resulting organic layer can then be taken up in an additional quantity of diethyl ether, washed with water and finally dried over sodium sulfate. Removal of the ether by evaporation yields the final product which is a mixture of the ortho and para isomers. Further distillation gives a purified mixed product from which the individual isomers can be separated by vacuum distillation through an efficient column. Reaction temperature can be varied between about 0° to about 85° and preferably will be maintained between about 0° and about 50° C. The temperature of the reaction has an effect on the ratio of the ortho and para isomers formed and in the lower temperature range up to about 10° C. the ratio of the ortho to the para isomer is 2/3 and at 25° the ratio is about 1/1.8.

1,1-dihalo-2-phenylcyclopropane compounds useful as starting materials in the process of this invention include: 1,1-dichloro-2-phenylcyclopropane, 1 - chloro - 1 - bromo-2-phenylcyclopropane, 1,1-dibromo-2-phenylcyclopropane, 1-chloro-1-bromo-2-methyl-2-phenylcyclopropane, 1,1-dichloro-2-n-propyl-2-phenylcyclopropane, 1-chloro-1 - bromo - 2 - isobutyl - 2-phenylcyclopropane, 1,1-dibromo-2-n-amyl-2-phenylcyclopropane, 1-chloro-1-bromo-2 - methyl-2-phenylcyclopropane, etc.

The 1,1-dihalo-2-phenylcyclopropane starting materials for the method of this invention can be prepared by the process set forth in U.S. Pat. 3,376,349. For example, the compound 1,1-dichloro-2-phenylcyclopropane can be prepared as follows:

A mixture of 104 g. styrene, 120 g. of chloroform, 120 g. sodium hydroxide, 10 g. of water and 100 ml. of tertiary amyl alcohol is rapidly stirred and heated under reflux at 90–97° C. for 35 minutes. At this point the mixture contains about 1.5 moles of water, and the conversion to the dichlorocarbene adduct is about 60 percent of theory based on the styrene charged.

An additional quantity of 60 g. (0.5 mole) of chloroform and 40 g. (1 mole) of sodium hydroxide is added to the cooled product. This reaction mixture is rapidly stirred and then reheated to 101° C. under reflux during a period of about 45 minutes. Upon cooling, pouring into 500 ml. of water, and working up the water-insoluble layer by distillation under reduced pressure, the yield of 1,1-dichloro-2-phenylcyclopropane obtained, (boiling at 77–79° C./2 mm.; $n_D^{25}$ 1.5505) is about 153 g. or 82 percent of theory, based on the styrene charged.

In a like manner, the compound 1,1-dibromo-2-phenylcyclopropane can be prepared as described above by reacting bromoform, styrene, and sodium hydroxide in the presence of water and tertiary amyl alcohol with rapid stirring and heating under reflux.

The compounds of this invention are useful as fungicides, insecticides or herbicides. These compounds show excellent aquatic herbicidal properties against duckweed and algae. In addition, the compounds of this invention can be added to polyethylene, polyurethanes to form compositions highly resistant to fungi and algae attack in both soils and aquatic media. For example, a composition comprising about 2.5 percent by weight of:

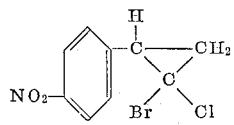

in acetone can be applied to polyethylene sheeting to yield, after drying, a sheet material highly resistant to fungi. The products of this invention can also be added to paints, lacquers, varnishes and polishing waxes, in an amount of from about 0.25 to about 2.5 percent or more by weight, which after application give surfaces with a high order of resistance to attack by fungi.

The following examples illustrate specific embodiments of this invention and are to be considered not limitative.

EXAMPLE I

A mixture of 200 g. of nitric acid (70 percent) and 300 g. of sulfuric acid (96–98 percent) was added over a period of 2.25 hours to 376 g. (2.0 mole) of 1,1-dichloro-2-phenylcyclopropane with vigorous stirring in a water bath at 20–30° C. Stirring was continued for an additional 1.75 hours. The reaction mixture (emulsion) was poured onto 700 g. of crushed ice and treated slowly with 30–40 ml. of diethyl ether to break the emulsion. The organic layer was taken up in 400 ml. of ether, washed with two 100 ml. portions of water, and dried over sodium sulfate.

The ether was removed by evaporation and the product (a mixture of the ortho and para isomers, 1:2) was distilled at 142–144° C./0.7 mm.; $n_D^{25}$ 1.5838, to yield 415 g. (89 percent theory) a pale yellow oil.

The isomers formed have the following formula:

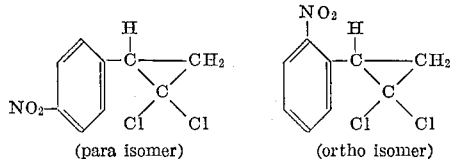

(para isomer)  (ortho isomer)

The amount of each isomer present was determined by vapor phase chromatography and nuclear magnetic resonance studies. Separation of the isomers can be accomplished by distilling the mixture through an efficient column under reduced pressure.

EXAMPLE II

A number of additional examples were performed in the same manner as Example I above and with the same apparatus. Pertinent data relating to these examples is shown in Table 1 which follows:

What is claimed is:

1. A compound of the formula:

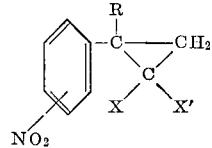

wherein R is selected from the group consisting of hydrogen and alkyl of from 1 to 5 carbon atoms and X and X' are selected from the group consisting of chlorine and bromine.

2. The compound of claim 1 having the formula:

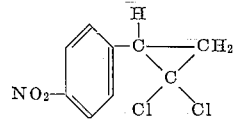

3. The compound of claim 1 having the formula:

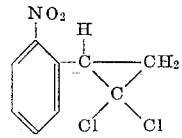

4. A method for preparing a compound of the formula:

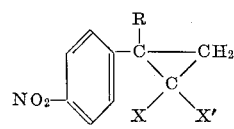

wherein R is selected from the group consisting of hydrogen and alkyl of from 1 to 5 carbon atoms and X and X' are selected from the group consisting of chlorine and bromine, which comprises reacting a compound of the formula:

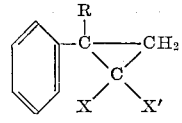

wherein R, X and X' have the same meaning as previously described with a mixture of concentrated nitric and concentrated sulfuric acid.

5. The method of claim 4 wherein the said compound is:

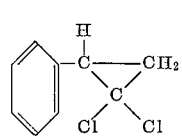

6. The method of claim 4 wherein the said concentrated nitric acid is about 70 percent and the said concentrated sulfuric acid is about 98 percent.

TABLE 1.—PREPARATION OF ORTHO AND PARA-(2,2-DICHLOROCYCLOPROPYL)NITROBENZENE

| Example | Moles HNO₃ | Moles H₂SO₄ | Moles A | Addition time (hrs.) | Addition temp. (° C.) | Stirring time (hrs.) | Stirring temp. (° C.) | Mode of addition | Yield (percent) | Remarks |
|---|---|---|---|---|---|---|---|---|---|---|
| II | 0.22 | 0.3 | 0.2 | 1 | 10–12 | 1.75 | 45–47 | Acid to A | 67.5 | |
| III | 1.1 | 1.5 | 1.0 | 0.58 | 20 | 1.5 | 30–35 | ___do___ | 69 | Ratio o/p isomer=2/3. |
| IV | .55 | .75 | .5 | .67 | 10 | 4 | 10–12 | ___do___ | 75 | Ratio o/p isomer=2/3. |
| V | .55 | .75 | .5 | 1.5 | 3–5 | 0.50 | 5 | ___do___ | 59 | 33 percent recovery of starting compounds. |

NOTE: A=1,1-dichloro-2-phenylcyclopropane.

7. The method of claim 4 wherein the said compound is:
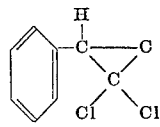
and the said concentrated nitric acid is about 70 percent and the said concentrated sulfuric acid is about 98 percent.
References Cited
UNITED STATES PATENTS
3,481,993  12/1969  Holan _____ 260—646
LELAND A. SEBASTIAN, Primary Examiner
U.S. Cl. X.R.
71—66, 67, 125; 424—349